(12) United States Patent
Nguyen et al.

(10) Patent No.: US 12,536,836 B2
(45) Date of Patent: Jan. 27, 2026

(54) HUMAN OBJECT INTERACTION DETECTION USING COMPOSITIONAL MODEL

(71) Applicant: Accenture Global Solutions Limited, Dublin (IE)

(72) Inventors: David Nguyen, Newark, CA (US); Hailing Zhou, Shenzhen (CN); Nan Ke, Xiamen (CN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 561 days.

(21) Appl. No.: 18/152,627

(22) Filed: Jan. 10, 2023

(65) Prior Publication Data
US 2024/0233439 A1 Jul. 11, 2024

(51) Int. Cl.
G06V 40/20 (2022.01)
G06F 40/30 (2020.01)
G06V 10/74 (2022.01)
G06V 10/774 (2022.01)
G06V 20/70 (2022.01)

(52) U.S. Cl.
CPC .............. *G06V 40/20* (2022.01); *G06F 40/30* (2020.01); *G06V 10/761* (2022.01); *G06V 10/774* (2022.01); *G06V 20/70* (2022.01)

(58) Field of Classification Search
CPC ...... G06V 40/20; G06V 20/70; G06V 10/761; G06V 10/774; G06F 40/30
See application file for complete search history.

(56) References Cited

U.S. PATENT DOCUMENTS

| | | | | |
|---|---|---|---|---|
| 11,410,449 B2* | 8/2022 | Wang | ...................... | G06N 20/20 |
| 11,734,924 B1* | 8/2023 | Nguyen | ................. | G06V 20/17 |
| | | | | 382/103 |
| 11,748,571 B1* | 9/2023 | Glavaš | ................. | G06F 40/289 |
| | | | | 704/9 |
| 11,784,964 B2* | 10/2023 | Khasanova | ............. | H04L 41/16 |
| | | | | 709/245 |

(Continued)

OTHER PUBLICATIONS

Hou, Zhi et al., Visual Compositional Learning for Human-Object Interaction Detection, Oct. 4, 2020 (Year: 2020).*

(Continued)

*Primary Examiner* — Kevin Ky
(74) *Attorney, Agent, or Firm* — Mannava & Kang, P.C.

(57) ABSTRACT

Implementations include actions of receiving an image; extracting a visual HOI and a set of visual embeddings, the visual HOI indicating a subject and an object; obtaining, using a vector library, a set of semantic HOIs and sets of semantic embeddings based on the subject, the object and a set of verbs included in the vector library, each set of semantic embeddings corresponding to a semantic HOI; processing, by a compositional model, the set of visual embeddings to provide a set of transition visual embeddings; processing the sets of semantic embeddings to provide respective sets of transition semantic embeddings; determining a set of scores based on the set of transition visual embeddings and the sets of transition semantic embeddings, each score representing a degree of similarity between the visual HOI and a semantic HOI; and determining at least one predicted HOI represented within the image based on the scores.

18 Claims, 5 Drawing Sheets

(56) References Cited

U.S. PATENT DOCUMENTS

| | | | | |
|---|---|---|---|---|
| 2021/0049236 | A1* | 2/2021 | Nguyen | G06F 40/205 |
| 2021/0295091 | A1* | 9/2021 | Li | G06V 10/7753 |
| 2021/0374553 | A1* | 12/2021 | Li | G06V 10/7792 |
| 2022/0108195 | A1* | 4/2022 | Kehler | G06T 15/08 |
| 2022/0139384 | A1* | 5/2022 | Wu | G06F 40/35 |
| | | | | 704/257 |
| 2022/0180101 | A1* | 6/2022 | Rai | G06N 3/045 |
| 2022/0279220 | A1* | 9/2022 | Khavronin | G06Q 30/0201 |
| 2022/0358005 | A1* | 11/2022 | Saha | G06F 40/216 |
| 2022/0374595 | A1* | 11/2022 | Gotmare | G06F 40/40 |
| 2022/0391640 | A1* | 12/2022 | Xing | G06N 3/084 |
| 2022/0391755 | A1* | 12/2022 | Li | G06V 30/153 |
| 2022/0405501 | A1* | 12/2022 | Chowdhury | G06V 10/82 |
| 2023/0102422 | A1* | 3/2023 | Zhou | G06V 10/82 |
| | | | | 382/156 |
| 2023/0177384 | A1* | 6/2023 | Nagrani | G06N 3/045 |
| | | | | 706/12 |
| 2024/0233439 | A1* | 7/2024 | Nguyen | G06V 40/20 |

OTHER PUBLICATIONS

Li, Zhimin et al., Improving Human-Object Interaction Detection via Phrase Learning and Label Composition, Jan. 15, 2022 (Year: 2022).*

Hou et al., "Affordance Transfer Learning for Human-Object Interaction Detection," Presented at Proceedings of the 2021 IEEE/CVF Conference on Computer Vision and Pattern Recognition (CVPR), Nashville, TN, USA, Jun. 20-25, 2021, 495-504.

Hou et al., "Detecting Human-Object Interaction via Fabricated Compositional Learning," Presented at Proceedings of the 2021 IEEE/CVF Conference on Computer Vision and Pattern Recognition (CVPR), Nashville, TN, USA, Jun. 20-25, 2021, 14646-14655.

Hou et al., "Visual Compositional Learning for Human-Object Interaction Detection," Presented at Proceedings of the European Conference on Computer Vision 2020, Glasgow, UK, Aug. 23-28, 2020, 17 pages.

Kato et al., "Compositional Learning for Human Object Interaction," Presented at Proceedings of the European Conference on Computer Vision 2018, Munich, Germany, Sep. 8-14, 2018; Computer Vision—ECCV 2018, Oct. 9, 2018, 11218:247-264.

Li et al., "HOI Analysis: Integrating and Decomposing Human-Object Interaction," Presented at Proceedings of the 34th International Conference on Neural Information Processing Systems, Vancouver, Canada, Dec. 6-12, 2020, 12 pages.

Liu et al., "ConsNet: Learning Consistency Graph for Zero-Shot Human-Object Interaction Detection," Presented at Proceedings of the 28th ACM International Conference on Multimedia, Seattle, WA, USA, Oct. 12-16, 2020, 4235-4243.

Maraghi et al., "Scaling Human-Object Interaction Recognition in the Video through Zero-Shot Learning," Comput. Intell. Neuroscience, Jun. 9, 2021, 2021:9922697, 15 pages.

* cited by examiner

HUMAN OBJECT INTERACTION DETECTION USING COMPOSITIONAL MODEL

BACKGROUND

Human activity recognition is the process of interpreting human motion using computer and machine vision technology. Human motion can be interpreted as activities, gestures, or behaviors. For example, human activity recognition can identify and name activities of a person based on gathered raw data from various sources (e.g., devices). Examples of such devices can include wearable sensors, electronic device sensors, camera devices, closed-circuit television, and some commercial off-the shelf equipment.

SUMMARY

Implementations of the present disclosure are generally directed to detecting human object interaction (HOI) in images. More particularly, implementations of the present disclosure are directed to an HOI detection system that determines HOIs in image data using a compositional model that accounts for semantic components and visual components.

In some implementations, actions include receiving an image; extracting, by a feature embedding model, a visual HOI and a set of visual embeddings, the visual HOI indicating a subject and an object; obtaining, using a vector library, a set of semantic HOIs and sets of semantic embeddings based on the subject, the object and a set of verbs included in the vector library, each set of semantic embeddings corresponding to a semantic HOI; processing, by a compositional model, the set of visual embeddings to provide a set of transition visual embeddings; processing, by the compositional model, the sets of semantic embeddings to provide respective sets of transition semantic embeddings; determining a set of scores based on the set of transition visual embeddings and the sets of transition semantic embeddings, each score representing a degree of similarity between the visual HOI and a semantic HOI of the set of semantic HOIs; and determining at least one predicted HOI represented within the image based on the scores. Other implementations of this aspect include corresponding systems, apparatus, and computer programs, configured to perform the actions of the methods, encoded on computer storage devices.

These and other implementations can each optionally include one or more of the following features. In some implementations, the compositional model includes a set of visual models and a set of language models, the set of visual models including a subject visual model, an object visual model, and a union visual model, and the set of language models including a subject language model, an object language model, and a verb language model.

In some implementations, the vector library includes a set of subject word embeddings, a set of object word embeddings, and a set of verb word embeddings. In some implementations, the vector library includes word embeddings generated by processing labels of training data using a word embedding model, the training data being used to train the compositional model.

In some implementations, determining at least one predicted HOI includes: identifying a semantic HOI as having a highest score; and providing the semantic HOI with the highest score as the at least one predicted HOI.

In some implementations, determining a set of scores based on the set of transition visual embeddings and the sets of transition semantic embeddings includes, for each set of transition semantic embeddings: determining a first distance between a transition visual embedding representative of the subject and a transition semantic embedding representative of the subject; determining a second distance between transition visual embedding representative of the object and a transition semantic embedding representative of the object; determining a third distance between a transition visual embedding representative of bounding boxes and a transition semantic embedding representative of a verb, the bounding boxes bounding the subject and the object within the image; and determining an aggregate distance using the first distance, the second distance, and the third distance. In some implementations, each of the first distance, the second distance, and the third distance is at least partially determined as a cosine distance.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

Like reference numbers and designations in the various drawings indicate like elements.

DETAILED DESCRIPTION

Implementations of the present disclosure are generally directed to detecting human object interaction (HOI) in images. More particularly, implementations of the present disclosure are directed to an HOI detection system that determines HOIs in image data using a compositional model that accounts for semantic components and visual components. In some implementations, the compositional model includes a set of language models, a set of visual models, and a scoring module. In some examples, the set of language models processes word embeddings associated with an image to provide respective semantic embeddings and the set of visual models processes HOI embeddings to provide respective visual embeddings. In some examples, the semantic embeddings and the visual embeddings are processed by the scoring module to determine a score for each HOI in a set of HOIs. An HOI can be selected for the image based on the scores.

In some implementations, actions include receiving an image; extracting, by a feature embedding model, a visual HOI and a set of visual embeddings, the visual HOI indicating a subject and an object; obtaining, using a vector library, a set of semantic HOIs and sets of semantic embeddings based on the subject, the object and a set of verbs included in the vector library, each set of semantic embeddings corresponding to a semantic HOI; processing, by a compositional model, the set of visual embeddings to provide a set of transition visual embeddings; processing, by the compositional model, the sets of semantic embeddings to provide respective sets of transition semantic embeddings; determining a set of scores based on the set of transition visual embeddings and the sets of transition semantic embeddings, each score representing a degree of similarity between the visual HOI and a semantic HOI of the set of semantic HOIs; and determining at least one predicted HOI represented within the image based on the scores.

To provide further context, and as introduced above, automated systems have been developed in an effort to recognize HOI in images. An example system includes machine learning (ML) models that are trained on a set of image data with each image being labeled with a certain HOI. However, such ML models face data sparsity issues. For example, a person may perform a rich set of actions and interact with a wide range of objects. To enable such ML models to recognize various HOI with various objects, a training data set covering all of the HOIs and all of the objects is optimal. However, it is difficult to obtain such a training data set covering all possible HOIs with all possible objects. For example, there can be unsafe or dangerous HOIs. As a result, images of actual occurrences of such HOIs may be limited or non-existent, so no or limited availability of training data representative of such HOIs for training of ML models. Without sufficient training data, the trained ML models may not be able to recognize rare HOIs that are non-existent or have relatively little representation in training data. This results in inaccuracy or failure of HOI detections using the trained ML models.

In view of the foregoing, and as introduced above, implementations of the present disclosure enable detection of HOIs not present or only having relatively limited representation in the training data. Implementations of the present disclosure are directed to a HOI detection system that detects HOIs in image data. In some implementations, the HOI detection system determines HOIs in image data using a compositional model that accounts for semantic components and visual components. As introduced above, the compositional model can include a set of language models, a set of visual models, and a scoring module. In some examples, the set of language models processes word embeddings associated with an image to provide respective semantic embeddings and the set of visual models processes HOI embeddings to provide respective visual embeddings. In some examples, the semantic embeddings and the visual embeddings are processed by the scoring module to determine a score for each HOI in a set of HOIs. An HOI can be selected for the image based on the scores.

Figure 1:
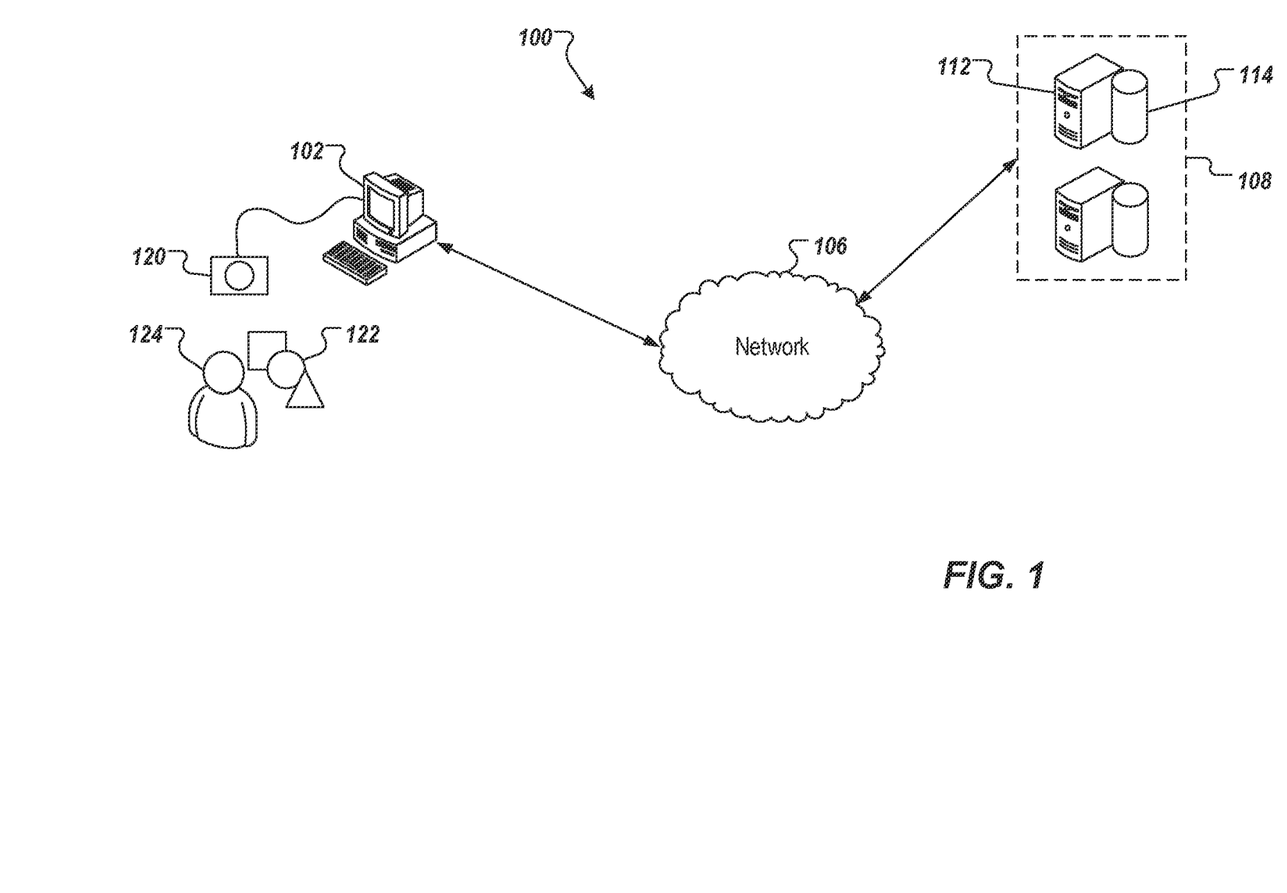
FIG. 1 depicts an example system that can execute implementations of the present disclosure.

FIG. 1 depicts an example system 100 that can execute implementations of the present disclosure. The example system 100 includes a computing device 102, a back-end system 108, and a network 106. In some examples, the network 106 includes a local area network (LAN), wide area network (WAN), the Internet, or a combination thereof, and connects web sites, devices (e.g., the computing device 102), and back-end systems (e.g., the back-end system 108). In some examples, the network 106 can be accessed over a wired and/or a wireless communications link.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the back-end system 108 includes at least one server system 112, and data store 114. In some examples, the at least one server system 112 hosts one or more computer-implemented services that users can interact with using computing devices. For example, the server system 112 can host systems for training ML models of a behavior-based SOP detection system in accordance with implementations of the present disclosure.

In the example of FIG. 1, a camera 120, objects 122, and a human 124 are depicted. The camera 120 can by any appropriate type of camera (e.g., video camera) that generates images representing entities in a scene of a real-world environment. In the context of the present disclosure, the camera 120 can generate images as digital data representing interactions of the human 124 with one or more of the objects 122 that are observed by the camera 120. In accordance with implementations, images can be processed by a HOI detection system to determine HOIs of the human 124 and object(s) 122 as represented within the images. In some examples, the HOI detection system is executed on the computing device 102. In some examples, the HOI detection system is executed in the back-end system 108.

Figure 2A:
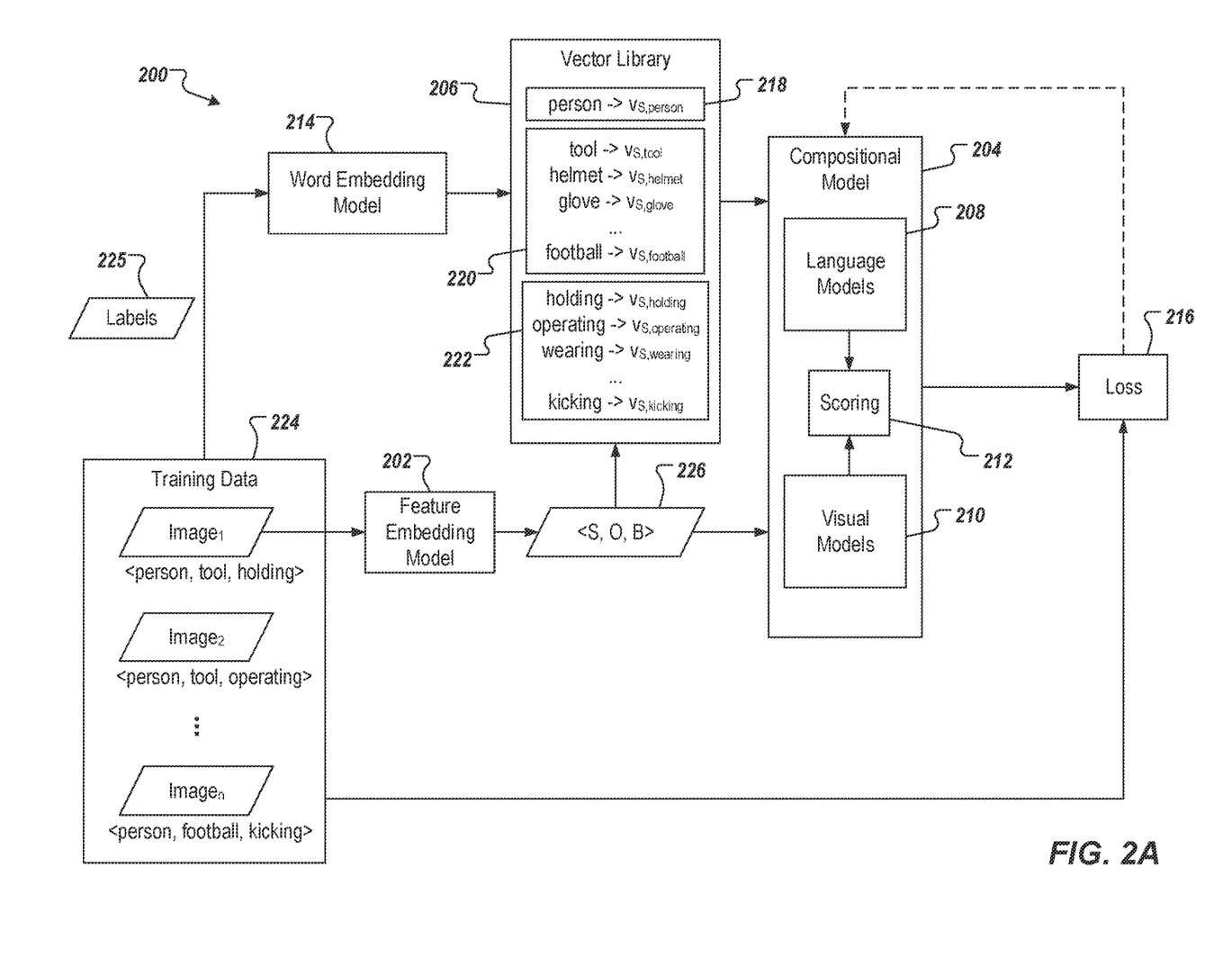
FIG. 2A depicts a conceptual architecture of a training phase in accordance with implementations of the present disclosure.

FIG. 2A depicts a conceptual architecture of a training phase of a HOI detection system 200 in accordance with implementations of the present disclosure. In the example of FIG. 2A, the HOI detection system 200 includes a word embedding model 214, a feature embedding model 202, a compositional model 204, and a vector library 206. The compositional model 204 includes a set of language models 208, a set of visual models 210, and a scoring module 212. During the training phase, the outputs of a word embedding model 214, a loss module 216, and the outputs of the feature embedding model 202 are used to train the compositional model 204, as described in further detail herein. As also described in further detail herein, during training, the vector library 206 is populated with sets of word embeddings that include a set of subject (person) word embeddings 218, a set of object word embeddings 220, and a set of verb word embeddings 222.

In further detail, during training, the HOI detection system 200 receives training data 224 as input. The training data 224 are processed for HOI detection. The training data 224 include images that each represent one or more HOIs. Each image is associated with a label that indicates an HOI represented in the image. For example, a first label for a first image can be <person, tool, holding> that indicates that the HOI in the first image is "a person holding a tool." A second label for a second image can be <person, tool, operating> that indicates the HOI in the second image is "a person operating a tool." A third label for a third image can be <person, football, kicking> that indicates the HOI in the third image is "a person kicking a football." In some examples, the training data can be frames from one or more videos that depict HOIs.

Each image of the training data 224 can be processed by the feature embedding model 202 to obtain a visual HOI 226 represented in the image. The feature embedding model 202 can determine the representation of a human and an object within the image as well as bounding boxes, one bounding the human and one bounding the object within the image. The visual HOI 226 can be represented as <S, O, B>, where S is the subject, O is the object, and B is the bounding boxes. For example, for the image with the HOI "a person kicking a football," S is "person," O is "football," and B is the bounding boxes (e.g., data defining each bounding box within the respective image) within which both "person" and "football" are represented in the respective image. In some examples, the visual HOI 226 includes a subject embedding, an object embedding, and a bounding box embedding. In some examples, the subject embedding is a multi-dimensional vector representative of the subject, as depicted in the respective image, the object embedding is a multi-dimensional vector representative of the object, as depicted in the respective image, and the bounding box embedding is a multi-dimensional vector representative of the bounding boxes determined for the subject and object from the image.

As described in further detail herein, the visual HOI 226 can be further processed by the visual model 210 of the compositional model 204 to obtain transition visual embeddings respectively representative of the subject, the object, and the bounding boxes of the respective image. The visual model 210 can include a set of ML models, one ML model for each visual embedding provided in the visual HOI 226. More detail is described in FIG. 2B.

In accordance with implementations of the present disclosure, labels 225 of the training data 224 can be processed by the word embedding model 214. The word embedding model 214 can convert the text of a word into an embedding (a vector) that encodes the word. An example word embedding model 214 can include Word2Vec. However, it is contemplated that implementations of the present disclosure can be realized with any appropriate word embedding model. In some examples, word embeddings can be described as encoding a semantic meaning of words, such that words that are closer in the embedding space are expected to have similar meaning. With reference to the example training data 224 depicted in FIG. 2A, for the first label of the first image <person, tool, holding>, the word embedding model 214 can convert the word "person" into a vector $v_{S,person}$, convert the word "tool" into a vector $v_{S,tool}$, and convert the word "holding" into a vector $v_{S,holding}$. Here, the subscript "S" indicates that the embedding is a semantic embedding (e.g., an embedding that encodes semantics of the respective word). By converting labels of the training data 224 into word embeddings, the vector library 206 can be obtained.

More particularly, during training, the vector library 206 is populated with sets of word embeddings that include the set of subject (person) word embeddings 218, the set of object word embeddings 220, and the set of verb word embeddings 222. In some examples, the labels 225 of the training data are processed and, for each unique subject, each unique object, and each unique verb, a respective word embedding is provided. For example, because each training example includes a subject of "person," the vector $v_{S,person}$ is generated once and is populated in the set of subject word embeddings 218 (e.g., the set of subject word embeddings 218 includes $v_{S,person}$). As another example, the object "tool" is included in the labels 225 multiple times. However, the vector $v_{S,tool}$ is only generated once for the object "tool" and is populated in the set of object word embeddings 220.

As discussed above, the visual HOI 226 determined for the image can be processed by the set of visual models 210 to provide visual embeddings in a transition space. Further, sets of tuples of word embeddings determined for the image can be processed by the set of language models 208 to provide sets of semantic embeddings in the transition space. Because both the semantic embeddings and the visual embeddings are in the transition space, distances there between can be determined in the transition space to avoid ambiguity and improve accuracy. The HOI detection system can determine a score indicating a distance between the semantic embeddings of each interaction and the visual embeddings determined for the image. More detail is described in FIG. 2B. The score can be an indicator of a degree of similarity between the semantic embeddings and the visual embeddings.

In further detail, during training and for each training example, a predicted result can be compared with the label of the image to determine a loss (e.g., by the loss module 216). A label in the labeled training data 224 can indicate a respective true result (ground truth) of the HOI included in the image. The loss can represent a difference between the predicted result and the label (e.g., ground truth). The loss can be used in back propagation for iteratively training the compositional model 204 (including language models 208 and visual models 210), during which parameters of the compositional model 204 are iteratively adjusted. The process can be repeated until the loss satisfies a threshold (e.g., the loss is at or below a threshold loss). The compositional model 204 can be machine learning (ML) models. In some examples, the compositional model 204 can be multi-layer perceptions (MLPs).

In general, a ML model can be iteratively trained, where, during an iteration, one or more parameters of the ML model are adjusted, and an output is generated based on the training data. For each iteration, a loss value is determined based on a loss function. The loss value represents a degree of accuracy of the output of the ML model. The loss value can be described as a representation of a degree of difference between the output of the ML model and an expected output of the ML model (the expected output being provided from training data). In some examples, if the loss value does not meet an expected value (e.g., is not equal to zero), parameters of the ML model are adjusted in another iteration of training. In some instances, this process is repeated until the loss value meets the expected value.

Figure 2B:
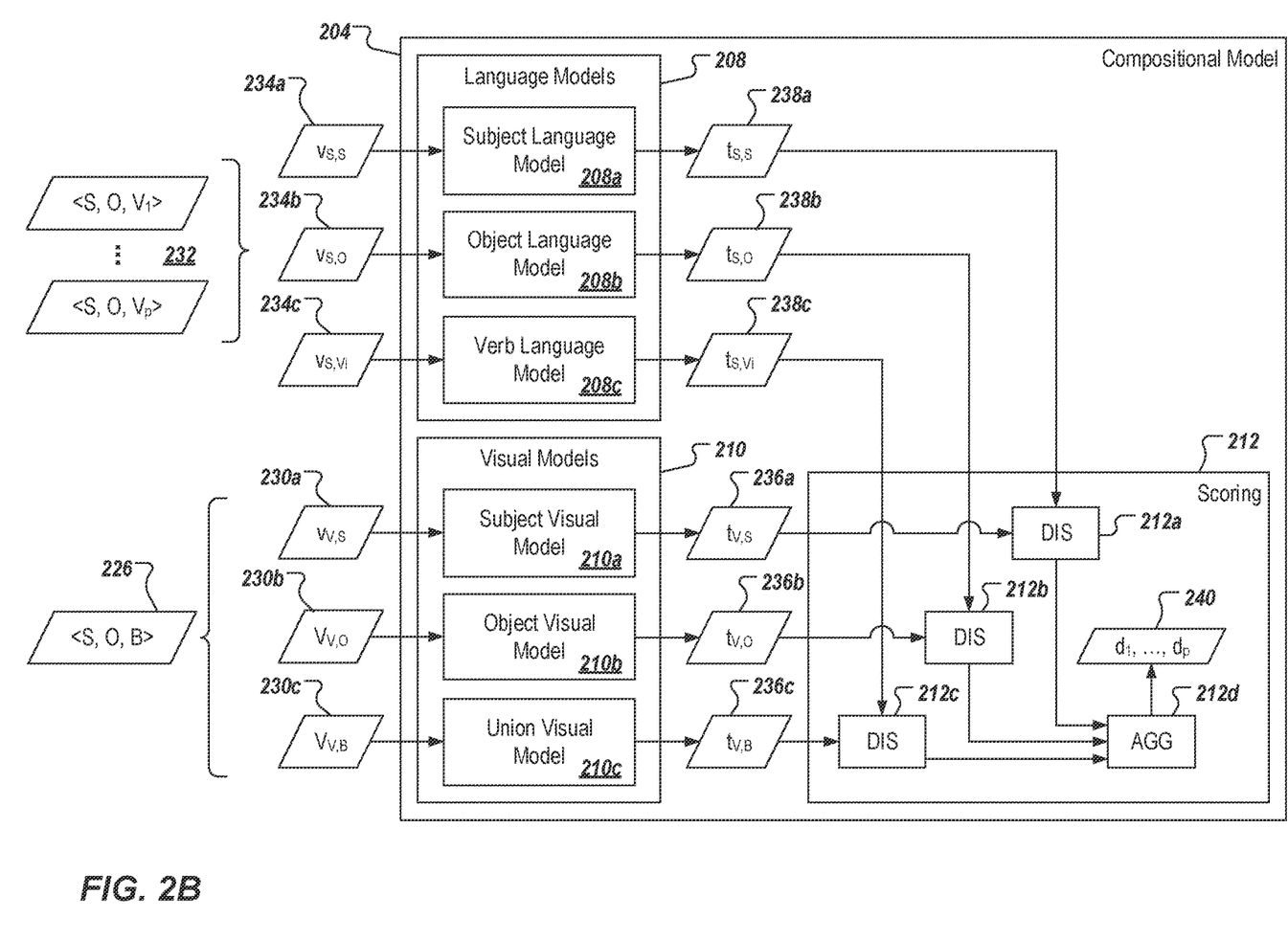
FIG. 2B depicts details of a compositional model in accordance with implementations of the present disclosure.

FIG. 2B depicts details of the compositional model 204 in accordance with implementations of the present disclosure. In the example of FIG. 2B, the set of language models 208 includes a subject language model 208a, an object language model 208b, and a verb language model 208c, and the set of visual models 210 includes a subject visual model 210a, an object visual model 210b, and a union visual model 210c. The scoring module 212 includes a subject distance module 212a, an object distance module 212b, an interaction distance module 212c, and an aggregation module 212d.

In accordance with implementations of the present disclosure, for each image, at least one visual HOI 226 is determined (e.g., by the feature embedding model 202) and includes a subject represented by a subject embedding 230a, an object represented by an object embedding 230b, and the bounding boxes represented by a bounding box embedding 230c. Here, the subscript "V" indicates a visual embedding (e.g., an embedding that encodes the representation of the respective S, O, B in the image). In some implementations, a set of semantic HOIs 232 is determined for the subject and object represented in the visual HOI 226. For example, for the subject and object pair provided in the visual HOI 226, verbs from the set of verb word embeddings 222 are combined to make respective semantic HOIs. For example, the set of verbs can include verbs $V_1, \ldots V_p$, which include the p unique verbs included in the labels 225. In other words, a semantic HOI is provided for each verb in the set of verbs. Each semantic HOI includes semantic embeddings 234a, 234b, 234c.

For purposes of non-limiting illustration, example semantic HOIs are provided based on the examples of FIG. 2A. In this example, it can be provided that the visual HOI 226 provided for an image includes the subject "person" and the object "tool." Consequently, the following example set of semantic HOIs are provided:

$$<V_{S,person}, V_{S,tool}, V_{S,holding}>$$

$$<V_{S,person}, V_{S,tool}, V_{S,operating}>$$

$$<V_{S,person}, V_{S,tool}, V_{S,wearing}>$$

$$\ldots$$

$$<V_{S,person}, V_{S,tool}, V_{S,kicking}>$$

In accordance with implementations of the present disclosure, the set of semantic HOIs 232 represent HOIs that are included in the training data and includes HOIs that are not represented in the training data. That is, the set of semantic HOIs includes a first sub-set of semantic HOIs and a second sub-set of semantic HOIs. The first sub-set of semantic HOIs includes HOIs that were represented as labels in the training data, and the second sub-set of semantic HOIs includes HOIs that were not represented as labels in the training data.

To illustrate this, the example set of semantic HOIs includes a first sub-set of semantic HOIs as $<v_{S,person}, v_{S,tool}, v_{S,holding}>$ and $<v_{S,person}, v_{S,tool}, v_{S,operating}>$, and a second sub-set of semantic HOIs as $<v_{S,person}, v_{S,tool}, v_{S,wearing}>$ and $<v_{S,person}, v_{S,tool}, v_{S,kicking}>$. In this example, one or more images of the training data were labeled with <person, tool, holding> and one or more images of the training data were labeled with <person, tool, operating>. However, no images in the training data were labeled with <person, tool, wearing> or <person, tool, kicking>. Consequently, while none of the images were labeled as representing either an HOI of "a person wearing a tool" or "a person kicking a tool," both of these HOIs are included in the set of semantic HOIs 232 for consideration in ultimately predicting a HOI for the image.

Referring again to FIG. 2B, the visual HOI 226, including a set of visual embeddings 230a, 230b, 230c, can be processed by the visual models 210 to obtain respective transition visual embeddings 236a, 236b, 236c. More specifically, the subject visual model 210a can process the subject embedding 230a to obtain the transition visual embedding 236a, the object visual model 210b can process the object embedding 230b to obtain the transition visual embedding 236b, and the union visual model 210c can process the bounding box embedding 230c to obtain the transition visual embedding 236c. Further, each semantic HOI, including semantic embeddings 234a, 234b, 234c, is processed by the set of language models 208 to obtain transition semantic embeddings 238a, 238b, 238c. More specifically, the subject language model 208a can process the subject word embedding 234a to obtain the transition semantic embedding 238a, the object language model 208b can process the object word embedding 234b to obtain the transition semantic embedding 238b, and the verb language model 208c can process the verb word embedding 234c to obtain the transition semantic embedding 238c. Each of the transition visual embeddings 236a, 236b, 236c and the transition semantic embeddings 238a, 238b, 238c is in a transition space represented as a number of dimensions. In this manner, each of the transition visual embeddings 236a, 236b, 236c and the transition semantic embeddings 238a, 238b, 238c are of the same order (e.g., a vector of the number of dimensions).

The scoring module 212 can determine a distance between each semantic HOI in the set of semantic HOIs 232 and the visual HOI 226 to provide a set of scores 240. In some implementations, each distance is determined between the transition semantic embeddings 238a, 238b, 238c and the transition visual embeddings 236a, 236b, 236c, respectively. For example, the subject distance module 212a determines a distance between the transition semantic embedding 238a of a respective semantic HOI and the transition visual embedding 236a, the object distance module 212b is determined between the transition semantic embedding 238b of a respective semantic HOI and the transition visual embedding 236b, and the interaction distance module 212c determines a distance between the transition semantic embedding 238c of a respective semantic HOI and the transition visual embedding 236c. In some examples, each distance is determined as a cosine distance between the respective pair of transition semantic embedding and the transition visual embedding. In some examples, each distance is determined as a dot product distance between the respective pair of transition semantic embedding and the transition visual embedding. Using dot product distance, each distance can be in a range [0, 1], inclusive, in which 0 indicates dissimilarity (e.g., at 0, vectors (embeddings) are orthogonal) and 1 indicates similarity (e.g., at 1, vectors (embeddings) are identical). That is, the closer a distance is to 1, the more similar the vectors are.

After the distance between each pair of transition semantic embedding and transition visual embedding is determined, respective aggregated distances can be determined by the aggregation module 212d to provide the set of scores 240. Each aggregated distance can be determined as an aggregation of the individual distances. In some examples, the aggregated distance can be a sum of the individual distances. In some examples, the aggregated distance can be a weighted sum of the individual distances. In the example of FIG. 2B, the set of scores 240 includes $d_1, \ldots, d_p$, where $d_1$ represents an aggregate distance between a first semantic HOI and the visual HOI 226, and $d_p$ represents an aggregate distance between a $p^{th}$ semantic HOI and the visual HOI 226. Each score d represents a degree of similarity (or dissimilarity) between a respective semantic HOI in the set of semantic HOIs 232 and the visual HOI 226. For example, $d_1$ is a score representing a similarity between <S, O, $V_1$> and <S, O, B>, $d_2$ is a score representing a similarity between <S, O, $V_2$> and <S, O, B>, and so on to $d_p$ representing a similarity between <S, O, $V_p$> and <S, O, B>. In some examples, the semantic HOI associated with the highest score (e.g., MAX($d_1$, . . . , $d_p$)) is selected as the predicted HOI for the image.

Figure 2C:
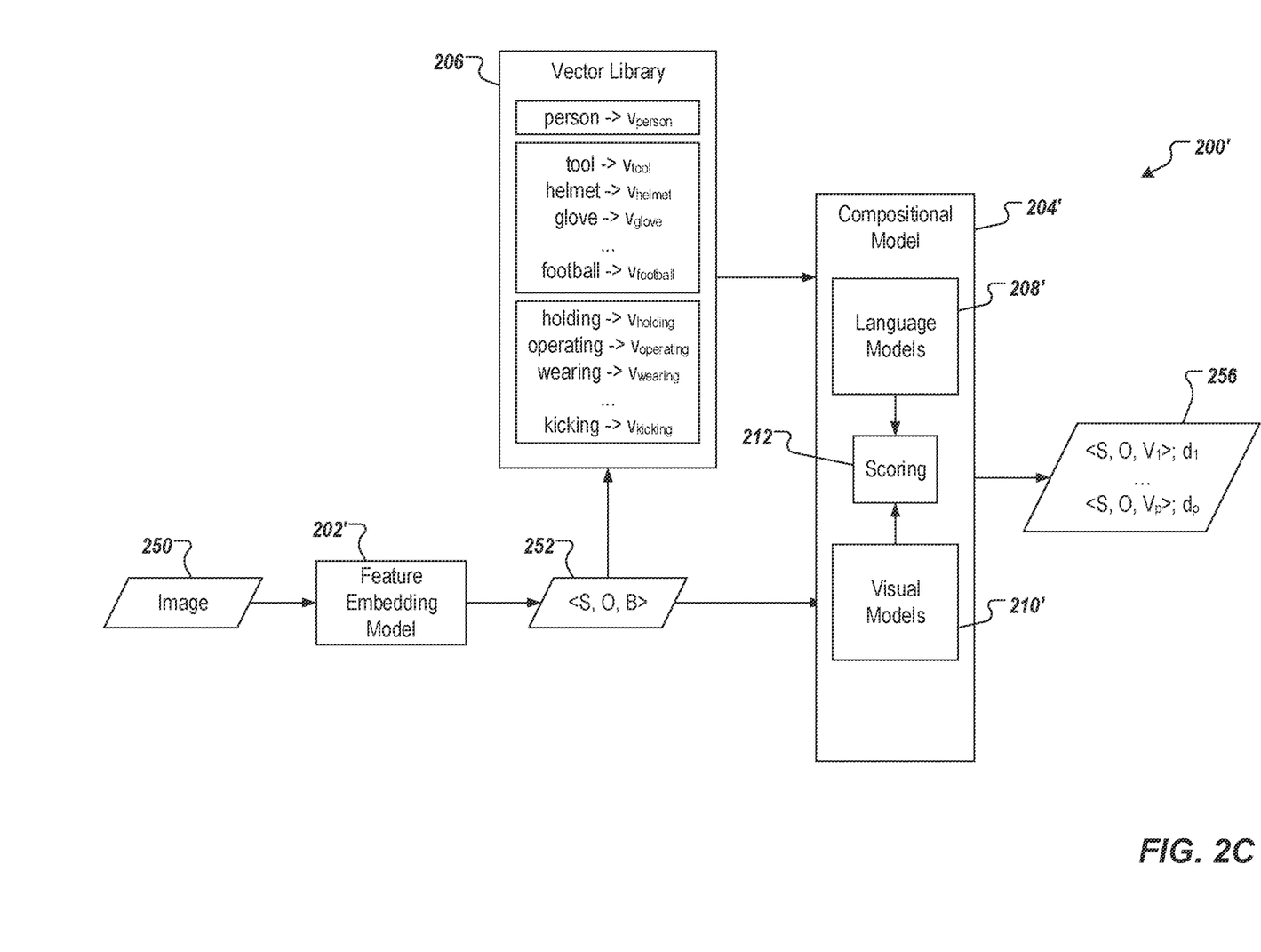
FIG. 2C depicts a conceptual architecture of an inference phase in accordance with implementations of the present disclosure.

FIG. 2C depicts a conceptual architecture of an inference phase of the HOI detection system 200' in accordance with implementations of the present disclosure. In the example of FIG. 2C, the HOI detection system 200' includes a feature embedding model 202', a compositional model 204', and the vector library 206. The compositional model 204' includes a set of language models 208', a set of visual models 210', and the scoring module 212. Here, the feature embedding model 202' and the compositional model 204' correspond to the feature embedding model 202 and the compositional model 204, respectively, after training and deployed for inference. As described in further detail herein, the HOI detection system 200' processes an image 250 to provide an output 256.

During the inference phase, the HOI detection system 200' can receive the image 250. The image 250 can be a frame from a video captured by a camera (e.g., the camera 120 of FIG. 1) installed in a scene of real-world environment for monitoring a human's operations for a task, for example. The image 250 can be processed using the feature embedding model 202' to obtain a visual HOI 252, where S is a subject, O is an object, and B represents bounding boxes for the subject S and the object O. The subject S and the object O can be provided to the vector library 206 to determine a set of semantic HOIs (e.g., as similarly discussed above with respect to the set of semantic HOIs 232 of FIG. 2B). In some examples, the set of semantic HOIs includes HOIs <S, O, $V_1$> . . . <S, O, $V_i$> . . . <S, O, $V_p$>, and their corresponding word embeddings <$v_{S,S}$, $v_{S,O}$, $v_{S,Vi}$> (where i indicates the $i^{th}$ verb word embedding and i=1, . . . , p).

The semantic (word) embeddings <$v_{S,S}$, $v_{S,O}$, $v_{S,Vi}$> of each semantic HOI can be processed by the set of language models 208' to provide respective transition semantic embeddings <$t_{S,S}$, $t_{S,O}$, $t_{S,Vi}$>. Consequently, sets of transition semantic embeddings are provided and include:

$$<t_{S,S}, t_{S,O}, t_{S,V1}>$$

$$<t_{S,S}, t_{S,O}, t_{S,V2}>$$

$$\ldots$$

$$<t_{S,S}, t_{S,O}, t_{S,Vp}>$$

Here, each set of transition semantic embeddings corresponds to a respective semantic HOI in the set of semantic HOIs. The set of visual embeddings <$v_{V,S}$, $v_{V,O}$, $v_{V,B}$> of the visual HOI 252 can be processed by the set of visual models 210' to provide a set of transition visual embeddings <$t_{V,S}$, $t_{V,O}$, $t_{V,B}$>.

The sets of transition semantic embeddings and the set of transition visual embeddings are input to the scoring module 212, which determines a set of scores, each score indicating a distance $d_i$ between a set of transition semantic embeddings <$t_{S,S}$, $t_{S,O}$, $t_{S,Vi}$> and the set of transition visual embeddings <$t_{V,S}$, $t_{V,O}$, $t_{V,B}$>. As such, a distance $d_i$ can represent a degree of similarity between a semantic HOI <S, O, $V_i$> and the visual HOI <S, O, B>. Scoring is described in further detail above with reference to FIG. 2B. In some examples, the compositional model 204' provides the output 256, which can include the set of semantic HOIs and, for each semantic HOI, a score $d_i$. For example:

| Transition Visual Embeddings | Transition Semantic Embeddings | Scores |
|---|---|---|
| <$t_{V,S}$, $t_{V,O}$, $t_{V,B}$> | <$t_{S,S}$, $t_{S,O}$, $t_{S,V1}$> | $d_1$ |
| | <$t_{S,S}$, $t_{S,O}$, $t_{S,V2}$> | $d_2$ |
| | . . . | |
| | <$t_{S,S}$, $t_{S,O}$, $t_{S,Vi}$> | $d_i$ |
| | . . . | |
| | <$t_{S,S}$, $t_{S,O}$, $t_{S,Vp}$> | $d_p$ |

Based on the scores ($d_1$, . . . , $d_p$), the HOI detection system 200' can determine the HOI that is predicted to be included in the image 250. In some examples, the HOI detection system 200' can choose the semantic HOI with the greatest score (indicating most similar to the visual HOI) as the HOI of the image 250. In some examples, the HOI detection system 200' can choose a subset of semantic HOIs, each semantic HOI having a score that satisfies a threshold (e.g., equal to or greater than the threshold) and output the subset of semantic HOIs as predicted HOIs included in the image 250.

By way of non-limiting example, the image 250 can depict a person kicking an airplane. In this example, the training data was absent any images with a label of <person, airplane, kicking>. However, the training data did include one or more images of a person kicking an object (e.g., football, board, punching bag). In this example, the HOI detection system 200' can provide a predicted HOI of <person, airplane, kicking> even though the ML models were not trained on such a HOI. As another non-limiting example, the image 250 can depict a person sitting on a railing. In this example, the training data was absent any images with a label of <person, railing, sitting>. However, the training data did include one or more images of a person sitting an object (e.g., chair, table, stool) and one or more images depicting a person and a railing (e.g., a person walking up stairs). In this example, the HOI detection system 200' can provide a predicted HOI of <person, railing, sitting> even though the ML models were not trained on such a HOI.

Figure 3:
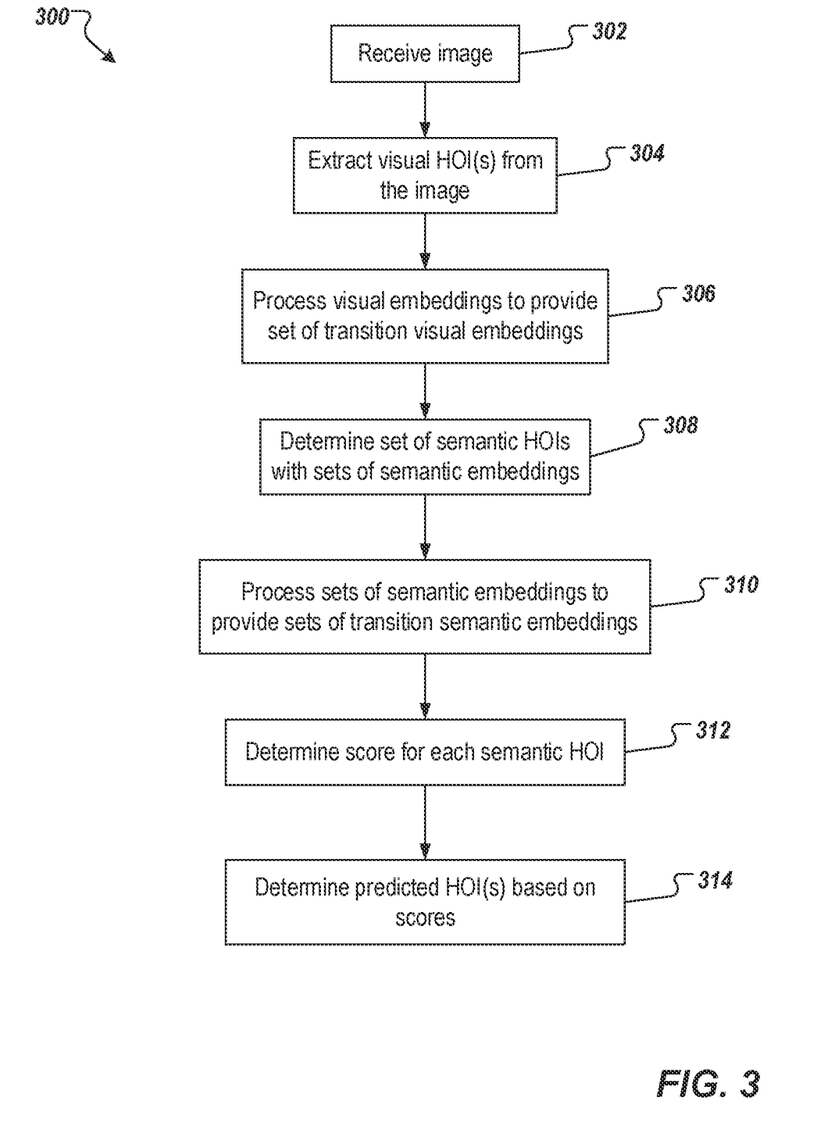
FIG. 3 depicts an example process that can be executed in accordance with implementations of the present disclosure.

FIG. 3 depicts an example process 300 that can be executed in implementations of the present disclosure. In some examples, the example process 300 is provided using one or more computer-executable programs executed by one or more computing devices. The example process 300 of FIG. 3 represents inference to determine a HOI represented within an image using a HOI detection system of the present disclosure.

An image is received (302). For example, and as described herein, the image can be received from a camera. In some examples, the image can be one or more frames included in a video captured by a camera (e.g., the camera 120 of FIG. 1). In some examples, the camera can be installed in a scene of a real-world environment and used to monitor a human's operations or interactions with one or more objects in a task.

One or more visual HOIs are extracted from the image (304). For example, and with reference to FIG. 2C, the image 250 is processed by the feature embedding model 202' to extract the visual HOI 252, which includes a subject, an object, and bounding boxes, and respective visual embeddings.

The set of visual embeddings are processed to provide a set of transition visual embeddings (306). For example, the set of visual embeddings are processed through respective ML models in the set of visual models 210', which can include the subject visual model 210a, the object visual model 210b, and the union visual model 210c, to provide the set of transition visual embeddings <$t_{V,S}, t_{V,O}, t_{V,B}$>.

A set of semantic HOIs with respective sets of semantic embeddings is determined (308). For example, and as described herein, the subject and the object of the visual HOI 252 can be provided as input to the vector library 206, which provides a set of semantic HOIs. The set of semantic HOIs 232 is determined for the subject and object represented in the visual HOI 252. For example, for the subject and object pair provided in the visual HOI, verbs from the set of verb word embeddings 222 are combined to make respective semantic HOIs. For example, the set of verbs can include verbs $V_1, \ldots V_p$, which include the p unique verbs included in the labels 225. In other words, a semantic HOI is provided for each verb in the set of verbs. Each semantic HOI includes a respective set of semantic embeddings (e.g., from the set of subject (person) word embeddings 218, the set of object word embeddings 220, and the set of verb word embeddings 222).

The sets of semantic embeddings of the semantic HOIs are processed to obtain respective sets of transition semantic embeddings (310). For example, and as described herein, each set of semantic embeddings <$v_{S,S}, v_{S,O}, v_{S,Vi}$> is processed through respective ML models in the set of language models 208', which can include the subject language model 208a, the object language model 208b, and the verb language model 208c, to provide the sets of transition semantic embeddings <$t_{S,S}, t_{S,O}, t_{S,V1}$>, ..., <$t_{S,S}, t_{S,O}, t_{S,Vp}$>.

A score is determined for each semantic HOI (312). For example, and as described herein, the sets of transition semantic embeddings <$t_{S,S}, t_{S,O}, t_{S,V1}$>, ..., <$t_{S,S}, t_{S,O}, t_{S,Vp}$> and the set of transition visual embeddings <$t_{V,S}, t_{V,O}, t_{V,B}$> are input to the scoring module 212, which determines a set of scores, each score indicating a distance $d_i$ between a respective set of transition semantic embeddings <$t_{S,S}, t_{S,O}, t_{S,Vi}$> and the set of transition visual embeddings <$t_{V,S}, t_{V,O}, t_{V,B}$>. As such, a distance $d_i$ can represent a degree of similarity between a semantic HOI <S, O, $V_i$> and the visual HOI <S, O, B>.

One or more HOIs represented within the image are determined based on the scores (314). For example, and as described herein, the HOI detection system 200' can choose the semantic HOI with the greatest score (indicating most similar to the visual HOI) as the HOI of the image 250. In some examples, the HOI detection system 200' can choose a subset of semantic HOIs, each semantic HOI having a score that satisfies a threshold (e.g., equal to or greater than the threshold) and output the subset of semantic HOIs as predicted HOIs included in the image 250.

Implementations of the present disclosure achieve one or more technical improvements. Implementations of the present disclosure use a compositional approach to address the data sparsity issues. The compositional approach includes three components, subject (human), verb, and object. The compositional approach can maximize the reuse of the components and apply them to novel tasks. For example, using the compositional approach, the possible interactions between a subject and an object can be maximized using all possible verbs. As a result, rare interactions (with limited occurrence or non-existence) between the subject and the object can be captured. As a result, by expanding the possible human-object-interactions using various verbs from a vector library, the HOI detection system of the present disclosure can increase the ability to recognize rare interactions with limited samples in the training data, and also provide the possibility to identify new interactions that may never exist in the training data.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for determining human-object interactions (HOIs) in images, the method comprising:
   receiving an image;
   extracting, by a feature embedding model, a visual HOI and a set of visual embeddings, the visual HOI indicating a subject and an object;
   obtaining, using a vector library, a set of semantic HOIs and sets of semantic embeddings based on the subject, the object and a set of verbs included in the vector library, each set of semantic embeddings corresponding to a semantic HOI;
   processing, by a compositional model, the set of visual embeddings to provide a set of transition visual embeddings;
   processing, by the compositional model, the sets of semantic embeddings to provide respective sets of transition semantic embeddings;
   determining a set of scores based on the set of transition visual embeddings and the sets of transition semantic embeddings, each score representing a degree of similarity between the visual HOI and a semantic HOI of the set of semantic HOIs, wherein determining the set of scores based on the set of transition visual embeddings and the sets of transition semantic embeddings comprises, for each set of transition semantic embeddings:
      determining a first distance between a transition visual embedding representative of the subject and a transition semantic embedding representative of the subject,
      determining a second distance between a transition visual embedding representative of the object and a transition semantic embedding representative of the object,
      determining a third distance between a transition visual embedding representative of bounding boxes and a transition semantic embedding representative of a verb, the bounding boxes bounding the subject and the object within the image,
      determining an aggregate distance using the first distance, the second distance, and the third distance; and
   determining at least one predicted HOI represented within the image based on the scores.

2. The method of claim 1, wherein the compositional model comprises a set of visual models and a set of language models, the set of visual models comprising a subject visual model, an object visual model, and a union visual model, and the set of language models comprising a subject language model, an object language model, and a verb language model.

3. The method of claim 1, wherein the vector library comprises a set of subject word embeddings, a set of object word embeddings, and a set of verb word embeddings.

4. The method of claim 1, wherein the vector library comprises word embeddings generated by processing labels of training data using a word embedding model, the training data being used to train the compositional model.

5. The method of claim 1, wherein determining at least one predicted HOI comprises:
identifying a semantic HOI as having a highest score; and
providing the semantic HOI with the highest score as the at least one predicted HOI.

6. The method of claim 1, wherein each of the first distance, the second distance, and the third distance is at least partially determined as a cosine distance.

7. A system, comprising:
one or more processors; and
a computer-readable storage device coupled to the one or more processors and having instructions stored thereon which, when executed by the one or more processors, cause the one or more processors to perform operations for determining human-object interactions (HOIs) in images, the operations comprising:
receiving an image;
extracting, by a feature embedding model, a visual HOI and a set of visual embeddings, the visual HOI indicating a subject and an object;
obtaining, using a vector library, a set of semantic HOIs and sets of semantic embeddings based on the subject, the object and a set of verbs included in the vector library, each set of semantic embeddings corresponding to a semantic HOI;
processing, by a compositional model, the set of visual embeddings to provide a set of transition visual embeddings;
processing, by the compositional model, the sets of semantic embeddings to provide respective sets of transition semantic embeddings;
determining a set of scores based on the set of transition visual embeddings and the sets of transition semantic embeddings, each score representing a degree of similarity between the visual HOI and a semantic HOI of the set of semantic HOIs, wherein determining the set of scores based on the set of transition visual embeddings and the sets of transition semantic embeddings comprises, for each set of transition semantic embeddings:
determining a first distance between a transition visual embedding representative of the subject and a transition semantic embedding representative of the subject,
determining a second distance between transition visual embedding representative of the object and a transition semantic embedding representative of the object,
determining a third distance between a transition visual embedding representative of bounding boxes and a transition semantic embedding representative of a verb, the bounding boxes bounding the subject and the object within the image,
determining an aggregate distance using the first distance, the second distance, and the third distance; and
determining at least one predicted HOI represented within the image based on the scores.

8. The system of claim 7, wherein the compositional model comprises a set of visual models and a set of language models, the set of visual models comprising a subject visual model, an object visual model, and a union visual model, and the set of language models comprising a subject language model, an object language model, and a verb language model.

9. The system of claim 7, wherein the vector library comprises a set of subject word embeddings, a set of object word embeddings, and a set of verb word embeddings.

10. The system of claim 7, wherein the vector library comprises word embeddings generated by processing labels of training data using a word embedding model, the training data being used to train the compositional model.

11. The system of claim 7, wherein determining at least one predicted HOI comprises:
identifying a semantic HOI as having a highest score; and
providing the semantic HOI with the highest score as the at least one predicted HOI.

12. The system of claim 7, wherein each of the first distance, the second distance, and the third distance is at least partially determined as a cosine distance.

13. A non-transitory computer-readable storage media coupled to one or more processors and having instructions stored thereon which, when executed by the one or more processors, cause the one or more processors to perform operations for determining human-object interactions (HOIs) in images, the operations comprising:
receiving an image;
extracting, by a feature embedding model, a visual HOI and a set of visual embeddings, the visual HOI indicating a subject and an object;
obtaining, using a vector library, a set of semantic HOIs and sets of semantic embeddings based on the subject, the object and a set of verbs included in the vector library, each set of semantic embeddings corresponding to a semantic HOI;
processing, by a compositional model, the set of visual embeddings to provide a set of transition visual embeddings;
processing, by the compositional model, the sets of semantic embeddings to provide respective sets of transition semantic embeddings;
determining a set of scores based on the set of transition visual embeddings and the sets of transition semantic embeddings, each score representing a degree of similarity between the visual HOI and a semantic HOI of the set of semantic HOIs, wherein determining the set of scores based on the set of transition visual embeddings and the sets of transition semantic embeddings comprises, for each set of transition semantic embeddings:
determining a first distance between a transition visual embedding representative of the subject and a transition semantic embedding representative of the subject,
determining a second distance between transition visual embedding representative of the object and a transition semantic embedding representative of the object,
determining a third distance between a transition visual embedding representative of bounding boxes and a transition semantic embedding representative of a verb, the bounding boxes bounding the subject and the object within the image,
determining an aggregate distance using the first distance, the second distance, and the third distance; and determining at least one predicted HOI represented within the image based on the scores.

14. The non-transitory computer-readable storage media of claim 13, wherein the compositional model comprises a set of visual models and a set of language models, the set of visual models comprising a subject visual model, an object visual model, and a union visual model, and the set of language models comprising a subject language model, an object language model, and a verb language model.

15. The non-transitory computer-readable storage media of claim 13, wherein the vector library comprises a set of subject word embeddings, a set of object word embeddings, and a set of verb word embeddings.

16. The non-transitory computer-readable storage media of claim 13, wherein the vector library comprises word embeddings generated by processing labels of training data using a word embedding model, the training data being used to train the compositional model.

17. The non-transitory computer-readable storage media of claim 13, wherein determining at least one predicted HOI comprises:
   identifying a semantic HOI as having a highest score; and
   providing the semantic HOI with the highest score as the at least one predicted HOI.

18. The non-transitory computer-readable storage media of claim 13, wherein each of the first distance, the second distance, and the third distance is at least partially determined as a cosine distance.

* * * * *